Figure 1:
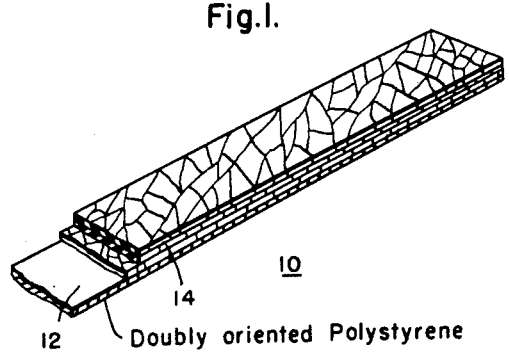

Dec. 15, 1959    N. C. FOSTER ET AL    2,917,420
METHOD OF INSULATING ELECTRICAL MEMBERS WITH
DOUBLY ORIENTED POLYSTYRENE BACKED MICA TAPE
Filed Oct. 15, 1953

WITTNESSES:
E.A. McCloskey
Leon M. Garman

INVENTORS
Newton C. Foster
and Harold M. Philofsky.
BY
Frederick Shapoe
ATTORNEY

United States Patent Office 2,917,420
Patented Dec. 15, 1959

2,917,420

METHOD OF INSULATING ELECTRICAL MEMBERS WITH DOUBLY ORIENTED POLYSTYRENE BACKED MICA TAPE

Newton C. Foster and Harold M. Philofsky, Pittsburgh, Pa., assignors to Westinghouse Electric Corporation, East Pittsburgh, Pa., a corporation of Pennsylvania Application October 15, 1953, Serial No. 386,282

3 Claims. (Cl. 154—2.28)

This invention relates to a novel mica tape and to electrical members, such as coils, prepared therewith.

Heretofore, mica tapes and sheet wrappers have been prepared from sheet backing material such as paper, glass cloth, or similar fibrous materials. When electrical conductors were wrapped with such mica tape, the sheet backing would resist subsequent penetration of impregnating varnishes which are usually required in preparing fully insulated electrical coils and other members.

Paper has been most widely used as a mica backing material for the reason that it is obtainable in sheets of considerable thinness whereby flexible tapes containing a high proportion of mica can be prepared therewith. However, the cellulose of which the paper is mainly comprised degenerates when exposed for prolonged periods of time to temperatures of above 110° C. At higher temperatures, paper deteriorates rapidly in strength and decomposes progressively faster. Thus, at 150° C., paper will become extremely brittle and weak after only a few days' exposure to such temperatures. In decomposing, cellulose gives off water and certain gases. Such water and gaseous products are undesirable in resinous impregnated electrical insulation for a number of reasons. Thus, these gases being generated internally tend to create voids in the insulation and corona thereupon will result in high voltage machines. Furthermore, the voids produced by the gases permit entry of water vapor into the insulation whereby its insulating characteristics are harmed.

The object of this invention is to provide a mica tape having a sheet backing composed of doubly oriented polystyrene.

Another object of the invention is to provide a mica tape comprising a sheet backing of doubly oriented polystyrene, a layer of mica flakes and a liquid resinous binder uniting the whole.

A further object of the invention is to prepare an electrical member by wrapping the member with a mica tape comprising polystyrene sheet backing which will dissolve in subsequently applied resinous impregnants whereby impregnation of the electrical member is expedited.

Figure 2:
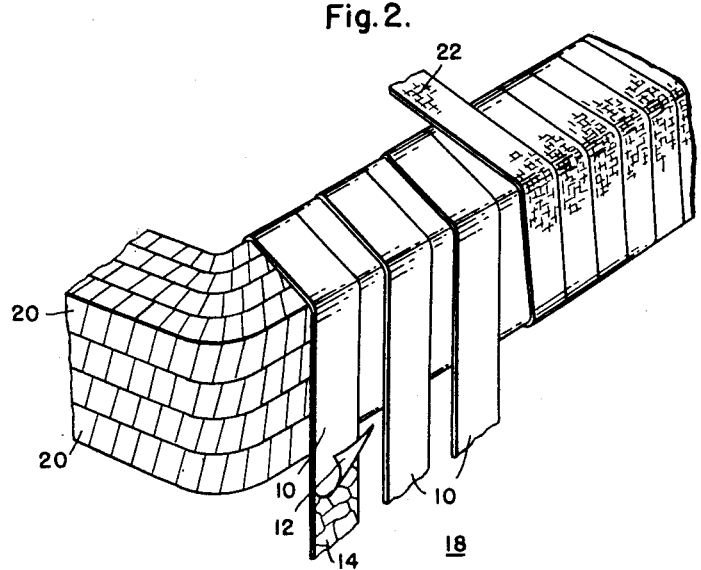

Other objects of the invention will in part be obvious and will in part appear hereinafter. For a better understanding of the nature and objects of the invention, reference should be had to the following detailed description and drawing, in which:

Figure 1 is a view in perspective, partly broken, of a mica tape prepared in accordance with the invention; and Fig. 2 is a fragmentary view in perspective of an electrical coil being wrapped in accordance with the invention.

We have discovered that an unusually useful wrapper tape and material may be prepared by employing as the sheet backing therefor doubly oriented polystyrene. Doubly oriented polystyrene is available in films of from ½ mil to 4 mils in thickness. It will be appreciated that in some instances films somewhat thinner than the minimum, as well as thicker films than the maximum, may be obtained and used. We have produced mica tape suitable for practically all applications in the electrical industry by using doubly oriented polystyrene film of a thickness of 1 and 2 mils. The doubly oriented polystyrene has great strength provided it is not heated substantially above 75° C. If heated to 100° C. or higher, the polystyrene will rapidly become disoriented and its strength will deteriorate so that the tape will no longer be satisfactory.

The film of doubly oriented polystyrene may comprise the straight polymer of monostyrene or polymers of monostyrene admixed with substituted monostyrene compounds such as paramethylstyrene. In some instances the polystyrene may be plasticized slightly.

In preparing mica tapes and wrappers, the sheet of doubly oriented polystyrene film has deposited thereon a layer of mica flakes either manually or in a suitable mica laying machine. Ordinarily on a 1 mil thick film of polystyrene a layer of mica flakes of 4 mils thickness is deposited. It is an important feature of the present invention to apply thereto a liquid resinous binder for uniting the mica flakes and the polystyrene sheet backing into a strong integral tape. We have found that the best results are had with liquid resinous polymers having a viscosity of from 25 to 10,000 poises at 25° C., the polymer being relatively non-volatile at room temperature and not decomposing or depolymerizing appreciably at temperatures of up to 150° C. Mica tapes and wrappers prepared with these liquid resinous polymers possess a high strength so that they may be wrapped very tightly and firmly about electrical conductors so as to produce dense and firm insulation. Inasmuch as a liquid resinous polymer is employed as the binder, the tape or tapes and wrappers prepared are extremely flexible so that they may be applied to almost any size or shape of conductor without loss of mica flakes or rupture of the tape.

Numerous liquid resinous polymers of a viscosity of between 25 and 10,000 poises, the polymers being relatively non-volatile at room temperature, are available as binders for the practice of the invention. One group of binders comprises the liquid polymers of a compound having the formula

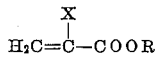

wherein X represents a monovalent radical selected from the group consisting of hydrogen and saturated aliphatic and cycloaliphatic hydrocarbon radicals and R is selected from the group of monovalent radicals consisting of hydrogen and saturated aliphatic hydrocarbon radicals. Examples of such compounds are the alkyl esters of acrylic acid and aliphatic esters of methacrylic and higher aliphatic acrylic acid esters. Examples of suitable compounds of this type are polymethylmethacrylate of a molecular weight of 1000, octyldecyl esters of methacrylic acid polymerized to a molecular weight of about 10,000, such liquid composition being sold under the trade name "Acryloid HF-45," polyamylacrylate, polyhexylmethacrylate, cyclohexylmethacrylate and the like, of a molecular weight of from 1000 to 10,000.

The liquid polymeric binders for the mica tape may comprise one or more polymers of a compound having the formula

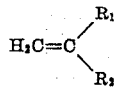

wherein $R_2$ represents a monovalent radical selected from the group consisting of phenyl, saturated alkyl hydrocarbon substituted phenyl, methyl and hydrogen radicals; and $R_1$ represents a monovalent radical selected from the group consisting of hydrogen, methyl and COOX radicals wherein X represents hydrogen and saturated alkyl hydrocarbon groups, and $R_1$ and $R_2$ do not represent the same radical. When $R_1$ is COOX, the previous group of esters of acrylic acid is included therein. Examples of this broad group of binders are polystyrene, 4-chlorostyrene, 2,4-dimethyl styrene, polyalphamethyl styrene, polyethylene, polymerized alphaphenyl acrylic acid, and polyalphamethylparamethyl styrene. We have secured excellent results with a liquid binder composed of polymerized alphamethylstyrene of an average molecular weight of between 400 and 2000. Polymerized alphamethylstyrene of an average molecular weight of 500 has a viscosity of approximately 2000 poises at 25° C. Mixtures of low molecular weight polystyrene, for example, 25 parts by weight of polystyrene of a molecular weight of 50,000 and 75 parts by weight of polyalphamethyl styrene of a molecular weight of 500 form a liquid suitable for use as a mica binder. Polymers of mixtures of arylalkene compounds, such as polymers of a mixture of styrene and coumarone or a mixture of styrene, coumarone and indene polymerized to low polymers of a viscosity between 25 and 10,000 poises have given excellent bonds to mica.

The liquid polymers of coumarone and indene, and liquid copolymers of both, or mixtures of each liquid polymer have proven to be excellent binders for the mica flakes.

The liquids produced by polymerizing beta-pinene in the presence of a catalyst have been found to be satisfactory binders. The formula for such polymers is:

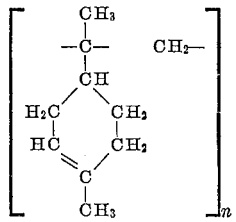

where $n$ has an average value of 4 or more.

A particularly useful class of liquid resinous polymers for the mica insulation of the present invention is liquid linear polyesters polymerized to a viscosity of between 25 and 10,000 poises at 25° C. Suitable esters may be produced by reacting a mono- or dicarboxylic acid or anhydride of the latter with a saturated aliphatic glycol. Some examples of such esters are triethylene glycol di-2-ethyl butyrate, di-2-ethylhexyl azaleate, di-2-ethylhexyl sebacate, di-n-hexyl fumarate polymer, and di-n-decyl succinate. The preparation of such esters is set forth in Patents 2,417,281 and 2,460,035. Abietic acid or rosin may be reacted with polyhydric alcohols such as ethylene glycol, glycerine and triethylene glycol to produce liquid esters. Other esters may be prepared by reacting an alpha, betaethylenically unsaturated dicarboxylic acid or anhydride thereof, such as for example, maleic acid, fumaric acid and citraconic anhydride with a saturated aliphatic glycol such, for example, as ethylene glycol, diethylene glycol, propylene glycol and polyethylene glycol, and one or more saturated dicarboxylic acids, such as adipic, sebacic or succinic acid. An example thereof is the reaction product of 1 mol of fumaric acid, 1 mol of adipic acid and 2 mols of diethylene glycol produced by heating the reactants at 175° C. for 1½ hours.

The liquid resinous polymers described herein may be employed individually or in admixture with one another; thus mixtures of liquid coumarone-indene polymers and liquid polymerized alpha-methylstyrene will give good results as a binder for the mica.

The amount of the liquid binder in the composite insulation should not exceed substantially 25% of the total weight of the insulation. Ordinarily the liquid binder should comprise not to exceed 8% of the total weight of the insulation as the maximum to enable the composite mica insulation is to be impregnated most satisfactorily with a completely reactive resinous composition. We have found that when from 3% to 7% by weight is the liquid binder, a composite mica tape of great strength is produced which lends itself to excellent impregnation.

In order to apply the liquid resinous binder to the mica flakes it is desirable to dissolve the liquid binder in a volatile organic solvent in order to render it more flowable and and penetrating. We have secured particularly good results with solutions comprising from 50 to 90% by weight of volatile organic solvent, the balance being the liquid resinous binder which will remain permanently in the mica tape or wrapper. It is necessary that the liquid organic solvent be such that it will not attack or dissolve the polystyrene sheet backing. Alcohols are good solvents for this purpose. The alcohol may be mixed with ketones. Ester solvents, such as butyl acetate, may be admixed with alcohol to produce suitable solvents for the liquid resinous polymers.

The following example is illustrative of the practice of the invention.

EXAMPLE I

A 1 mil thick film of doubly oriented polystyrene was covered with a 4 mil thick layer of mica flakes. The film with the applied mica flakes was then passed underneath a drip pan which applied a small quantity of the following solution, all parts being by weight:

| | Percent |
|---|---|
| Liquid polyester resin | 20 |
| Ethyl alcohol | 45 |
| Acetone | 35 |

The quantity of solution applied was such as to deposit the polyester resin in an amount equal to 5% of the weight of the mica flakes and polystyrene film. The tape was then passed into an oven where it was heated to a temperature of 70° C. to drive off the ethyl alcohol and acetone solvents. The resulting tape was found to be extremely flexible while being strong and durable.

The polyester resin employed in Example I was prepared as follows:

EXAMPLE II

A mixture of 44 mol percent of adipic acid and 6 mol percent of fumaric acid was combined with 50 mol percent of propylene glycol and reacted with $CO_2$ sparging, for about 4 hours at 140° C. in a closed reaction vessel, after which the temperature was raised to 220° C. over a 4-hour period and the reaction was continued at 220° C. for 8 hours. A syrupy polyester resin was produced.

A top sheet of polystyrene to form a facing for the mica tape or wrapper may be applied over the mica flakes immediately after the solution of liquid resinous polymer has been applied thereto. The tape may be compacted by passing it under a rubber roll immediately before passing into the oven wherein the organic solvents are removed.

Referring to Figure 1 of the drawing, there is illustrated a tape 10 prepared in accordance with the invention. The tape comprises the film 12 of doubly oriented polystyrene upon which is deposited the mica flakes 14. The binder comprising the liquid resinous polymer is disposed between the mica flakes and the film 12 to unite them together.

The resulting mica tape may be employed to replace conventional flexible mica tapes and wrappings previously employed in the electrical industry. Thus, the mica tape 10 may be employed as a coil wrapper and for similar applications, without being varnished or impregnated with a resin.

However, the outstanding merits of the mica tape of the present invention are evidenced when the tape 10 is applied to coils which are to be impregnated with certain completely reactive resinous compositions. If the completely reactive resinous compositions comprise a component that will dissolve polystyrene then the polystyrene film backing 12 will soften and dissolve when it comes in contact with such liquid resinous impregnants. As a consequence, the sheet backing can no longer oppose the penetration of the impregnant. Inasmuch as a liquid resinous binder is employed in the tape, the liquid resinous impregnant applied to the tape will penetrate far more readily and thoroughly between the mica flakes than would be the case if a solid resin binder were present in the mica tape. As a consequence, coils wrapped with many layers of the mica tape of this invention are readily impregnated with resins whereby to produce a solid homogeneous insulated coil.

Particularly good liquid resinous impregnating compositions for application to coils wrapped with the tape of the present invention are unsaturated polyester resins combined with a liquid aromatic monomeric compound having a >C=C< group. The unsaturated polyester resins are dissolved in the monomeric compound to produce a completely reactive thermosettable liquid composition. When this composition is applied to coils insulated with the mica tapes of the present invention, the liquid aromatic monomer quickly dissolves the polystyrene film and it readily penetrates between the mica flakes because its flow is not materially impeded by the liquid binder between the mica flakes.

Suitable liquid aromatic monomeric compounds are monostyrene, alphamethylstyrene, paramethylstyrene, and diallyl phthalate.

Completely-reactive multi-component polymerizable compositions are known to the art. Such compositions include an unsaturated resinous component—particularly an unsaturated polyester resin—and an unsaturated polymerizable liquid aromatic monomer. Particularly good results have been secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a substantially molar equivalent of a polyhydric alcohol such as ethylene glycol, glycerol, propylene glycol, diethylene glycol, or pentaerythritol or mixtures thereof. Castor oil has been employed successfully in reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, an ethylenically unsaturated alpha-beta dicarboxylic acid or anhydride may be replaced with up to 95% of the weight thereof by a saturated aliphatic dicarboxylic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols, particularly in reactions with dicarboxylic acids instead of their anhydrides.

An excellent completely reactive composition is one composed of a solution in from 90 to 50 parts of arylalkene polymerizable monomer of from 10 to 50 parts by weight of the alkyd reaction products of (A) an unsaturated acidic compound from the group consisting of maleic acid, maleic anhydride, fumaric acid, citraconic acid and citraconic anhydride in admixture with one or more saturated straight chain dicarboxylic acids having the carboxyl groups disposed at the end of the straight chain, the chain having from 2 to 10 non-carboxyl carbon atoms and no other reactive groups, and (B) a molar equivalent, within ±10%, of an aliphatic saturated glycol having no other reactive group than the hydroxyl groups. The proportion of the unsaturated acidic compound in the mixture of acids should be between 5% and 50% of the weight of the mixture. Suitable saturated dicarboxylic acids are adipic acid, sebacic acid, azelaic acid, suberic acid, succinic acid, decamethylene dicarboxylic acid and diglycolic acid and mixtures thereof. With the longer chain saturated dicarboxylic acids, as, for example, sebacic acid, the proportion of maleic anhydride, for example, may be higher than if the saturated acid were all succinic acid, if cured products of similar degrees of hardness are desired. Suitable glycols for reaction with the mixture of saturated and unsaturated acids are ethylene glycol, propylene glycol, diethylene glycol, 1,5-pentanediol and triethylene glycol. Mixtures of the glycols are suitable for producing the reaction product. The reaction of the (A) acidic compounds and (B) the glycols may be carried out by heating in a reaction vessel at temperatures of from 100° C. to 250° C. for from 24 hours to 2 hours to a low acid number of below 60.

Referring to Fig. 2 of the drawing, there is illustrated an electrical member comprising a coil 18 composed of turns of an insulated electrical conductor 20. The electrical conductor turns are wrapped with three layers of the mica tape 10 having the polystyrene film backing 12. An exterior wrapping of a tape 22 of glass fibers, for example, is applied in order to provide for an abrasion resistant surface on the final coil. The fully wrapped coil 18, produced as shown in Fig. 2, is then dried in an oven or in a vacuum tank at a moderate temperature of not in excess of 100° C. in order to remove moisture and other volatile matter that may be present within the coil. The heat treatment may deteriorate the strength of the polystyrene film but the polystyrene film has served its purpose and is no longer necessary. The dried coil 18 is then impregnated with a completely reactive, thermosettable liquid resinous composition containing an aromatic monomer which will dissolve polystyrene. When the liquid composition comes in contact with the polystyrene film 12 it will dissolve the polystyrene and thereby prevent the backing from impeding the penetration of the composition further into the coil as would be the case with paper or other backing materials. The liquid resinous binder between the mica flakes will dissolve and become admixed with the impregnating composition. Vacuum and pressure impregnation may be employed in order to insure complete filling of all of the interstices within the coil 18.

Thereafter the coil is removed from the impregnating composition and it is wrapped with a film of a composition impenetrable by the impregnating composition. Particularly good results have been secured with plastic or resinous tapes which are not subject to attack by the impregnating composition. We have employed tapes prepared from cellulose acetate, polyvinyl alcohol, polyvinylidene chloride, polytetrafluoroethylene, synthetic rubbers, such as chloroprene rubber, polyethyleneglycolterephthalate polymer, and polyethylene. Tape up to five mil thick, one inch wide, applied half-lapped, has been satisfactory. We have successfully used one mil thick tape, 1½ inches in width, composed of polyethylene glycol-terephthalate polymer. In some cases we have applied one layer of polytetrafluoroethylene tape and covered this over with a thinner and more elastic polyethylene tape wrapping. The polytetrafluoroethylene stripped very readily from the coils after curing of the resin. The applied tape serves a number of purposes. This impervious tape wrapping minimizes the loss of the composition during subsequent curing of the resin.

After the coil has been wrapped with the impervious tape it is heated to cure the applied liquid resinous composition. It will be appreciated that the liquid resinous impregnating composition in coil 18 has dissolved therein a minor proportion of polystyrene and liquid resinous binder present originally in the tape. These form a substantially homogeneous composition which will completely thermoset.

The following is an example of the preparation of coils, in accordance with this invention.

EXAMPLE III

A coil comprising an electrical conductor was wrapped with 15 layers of 4 mils thick mica tape, the mica tape comprising 1 mil thick doubly oriented polystyrene sheet backing and 3 mils of mica flakes, all united with the liquid binder previously described in Example II. The mica tape was 1 inch wide and the 15 layers were applied half-lapped. The coil was then wrapped with an outer layer of half-lapped glass fiber tape of a thickness of 3 mils. The insulated coil was then heated in an oven at a temperature of 100° C. for 16 hours to eliminate all tape solvents and moisture therefrom. The coil was then placed in an impregnating tank which was evacuated to an absolute pressure of from 3 to 5 mm. of mercury for 3 to 4 hours. In some cases the evacuation alone was employed without the previous heating at 100° C. with equally good results. The coil was then flooded with a liquid thermosettable completely reactive resinous composition, which will be described subsequently, and soaked therein for a period of time with atmospheric pressure on the resin. The resin impregnated coil was withdrawn from the impregnating tank and wrapped with a 1 mil thick film of polyethyleneglycol terephthalate polymer to prevent loss of the impregnating composition. The coil was then placed in a heated mold and pressed to size and shape at 85° C. for 16 hours. Thereafter, the coil was withdrawn from the press and the resin was further fully cured by being heated at 120° C. for 4 more hours. It will be appreciated that the resin may be cured in a single step by being heated in the press, for instance, for 4 hours at 140° C.

The resin employed in this preceding example comprised the resinous reaction of example II reacted to a viscosity of 1000 poises at 25° C. admixed with monostyrene in the proportion of 85 parts monostyrene to 15 parts of polyester resin, with 0.5% by weight of catalyst comprising di-tertbutyl peroxide. The following table gives the electrical properties of two coils prepared in accordance with the invention:

It will be appreciated that the impregnating composition applied to the coils may comprise a single reactive monomer such as diallyl phthalate, or other resins such as polyepoxide resins which comprise glycidyl ethers and the reaction products of 1 mol of bisphenol and from 1 to 2 mols of epichlorhydrin, as set forth in Patents 2,506,486; 2,548,447 and 2,324,483.

It will be understood that the above detailed description and drawing are only exemplary.

We claim as our invention:

1. In the process of producing an insulated electrical conductor, the steps comprising wrapping a conductor member with a mica tape, the mica tape comprising a sheet backing consisting of a film of doubly oriented polystyrene, a layer of mica flakes disposed on the polystyrene film backing and a liquid resinous binder having a viscosity of from 25 to 10,000 poises at 25° C., the liquid resinous binder uniting the mica flakes and polystyrene film into a strong, flexible tape, applying a fibrous sheet to the exterior of the wrapped conductor member, impregnating the resulting wrapped conductor member with a completely reactive thermosettable resinous composition composed essentially of from 90 to 50 parts by weight of a reactive arylalkene polymerizable monomer capable of dissolving polystyrene and from 10 to 50 parts by weight of an unsaturated polyester resin, the impregnating resinous composition dissolving both the polystyrene film and the liquid resinous binder as it penetrates into the wrapping whereby impregnation is more complete and more rapid, the dissolved polystyrene and the liquid resinous binder comprising only a minor proportion of the impregnating resinous composition, and curing the resinous composition to produce an electrical conductor having electrical insulation thereon comprising mica flakes and solid thermoset resinous composition impregnating the mica flakes.

2. The process of claim 1 wherein the completely reactive impregnating resinous composition comprises essentially a liquid aromatic monomeric compound having a $>C=C<$ group.

3. The process of claim 1 wherein the mica tape comprises both a top sheet and a backing sheet consisting of doubly oriented polystyrene.

*Table I*

| Bar | Power Factor (percent) | | | | | | Fail Voltage | | Dielectric strength, v./mil held | Insulation | |
|---|---|---|---|---|---|---|---|---|---|---|---|
| | 25° C. | | 100° C. | | 150° C. | | kv. | Time (sec.) | | Thickness (mils) | Percent Swell. (after about 18 hrs. at 150° C.) |
| | 2 kv. | 15 kv. | 2 kv. | 15 kv. | 2 kv. | 15 kv. | | | | | |
| 3 | 1.6 | 2.4 | 7.8 | 8.8 | 12.4 | 17.8 | 85 | 5 | 487 | 164 | 0 |
| 4 | 1.6 | 3.1 | 7.6 | 9.3 | 12.8 | 17.6 | 75 | 35 | 415 | 169 | 0 |

References Cited in the file of this patent

UNITED STATES PATENTS

| | | |
|---|---|---|
| 2,106,850 | McCulloch | Feb. 1, 1938 |
| 2,232,041 | Webb | Feb. 18, 1941 |
| 2,258,222 | Rochow | Oct. 7, 1941 |
| 2,497,376 | Swallow et al. | Feb. 14, 1950 |
| 2,542,827 | Minter | Feb. 20, 1951 |
| 2,622,656 | Pinsky | Dec. 23, 1952 |
| 2,656,290 | Berberich | Oct. 20, 1953 |

OTHER REFERENCES

Plastics (publication): Effect of Orientation on the Mechanical Properties of Polystyrene, September 1951.